United States Patent [19]

Iannicelli

[11] Patent Number: 4,923,688
[45] Date of Patent: May 8, 1990

[54] WET SCRUBBER PROCESS FOR REMOVING TOTAL REDUCED SULFUR COMPOUNDS FROM INDUSTRIAL GASES

[76] Inventor: Joseph Iannicelli, 796 S. Beachview Dr., Jekyll Island, Ga. 31520

[21] Appl. No.: 799,494

[22] Filed: Nov. 19, 1985

[51] Int. Cl.$^5$ .............................................. B01D 53/54
[52] U.S. Cl. ..................................... 423/224; 423/225
[58] Field of Search ........................ 423/225, 224, 230

[56] References Cited

U.S. PATENT DOCUMENTS

| | | | |
|---|---|---|---|
| 2,926,999 | 3/1960 | Tarbutton et al. | 423/242 |
| 2,984,545 | 5/1961 | Tarbutton et al. | 423/242 |
| 3,150,923 | 9/1964 | Bienstock et al. | 423/244 |
| 3,226,192 | 12/1965 | Atsukawa et al. | 423/242 |
| 3,330,096 | 7/1967 | Zimmerley | 423/49 |
| 3,492,083 | 1/1970 | Lowicki et al. | 423/244 A |
| 3,761,570 | 9/1973 | Lowicki et al. | 423/225 |
| 3,798,310 | 3/1974 | Atsukawa et al. | 423/244 A |
| 3,898,320 | 8/1975 | Atsukawa et al. | 423/605 |
| 3,969,479 | 7/1976 | Lonnes et al. | 423/210 |
| 4,076,793 | 2/1978 | Nikolai | 423/242 |
| 4,125,589 | 11/1978 | deVries | 423/245 |
| 4,164,545 | 8/1979 | Scott | 423/239 |
| 4,552,734 | 11/1985 | Iannicelli et al. | 423/230 |
| 4,552,735 | 11/1985 | Iannicelli et al. | 423/224 |

FOREIGN PATENT DOCUMENTS

| | | |
|---|---|---|
| 597254 | 1/1948 | United Kingdom. |
| 1078596 | 8/1967 | United Kingdom. |
| 1568916 | 6/1980 | United Kingdom. |
| 1576534 | 10/1980 | United Kingdom. |

OTHER PUBLICATIONS

CRC Handbook of Chemistry and Physics; Ed. by Weast, CRC Press, Inc., 1981, pp. E-120, 121.
Sewell, "Assessment of Some Solid Filters for Removing Hydrogen Sulphide and Sulphur Dioxide from Air", Report No. C.D. 2168, Chemistry Division, Department of Scientific and Industrial Research, New Zealand, Nov. 1973.
Hudson et al., "Hydrogen Sulfide Adsorption by Manganese Dioxide and Activated Carbon", *Environmental Science and Technology*, vol. 8, No. 3, Mar. 1974, pp. 238-243.
Turkdogan et al., "Desulfurization of Hot Reducing Gases with Manganese Oxide Pellets", *Proceedings International Iron and Steel Congress*, 3rd, American Society of Metallurgists, Ohio, (1979).
Chem. Abstracts, 1958, No. 9481D.
Chem. Abstracts, 1960, No. 9225C.
Chem. Abstracts, 1969, No. 49512C.
Lal, "On the Action of Hydrogen Sulphide on Manganese Dioxide", *Jour. Indian Chem. Soc.*, vol. 29, No. 12, 1982, pp. 934-936.
Uno et al., "Scale-Up of a SO$_2$ Control Process", *Chemical Engineering Progress*, vol. 66, No. 1, Jan. 1970, pp. 61-65.
Copeland et al., "Preparation of a Dry Depolarizer by Air Oxidation of Manganous Hydroxide", Oct. 17, 1947.
Kirk-Othmer: Encyclopedia of Chemical Technology, 3rd Edition, vol. 14, p. 856.

*Primary Examiner*—Jeffrey Edwin Russel
*Attorney, Agent, or Firm*—Banner, Birch, McKie & Beckett

[57] ABSTRACT

A wet scrubber process for removing Total Reduced Sulfur compounds and non-magnetic entrained particulates from an industrial gas is described which employs an aqueous absorbent slurry containing manganese dioxide absorbent particles. Scrubbing of the industrial gas with the absorbent slurry is followed by regeneration and recirculation of the aqueous absorbent slurry and magnetic separation to recover the non-magnetic entrained particulates separate from the manganese dioxide absorbent particles which are recycled.

11 Claims, 2 Drawing Sheets

WET SCRUBBER PROCESS FOR REMOVING TOTAL REDUCED SULFUR COMPOUNDS FROM INDUSTRIAL GASES

BACKGROUND OF THE INVENTION

1. Field of the Invention

The present invention relates to a wet scrubber process for removing Total Reduced Sulfur compounds (TRS), especially $H_2S$ and mercaptans, from industrial gases. More particularly, the present invention relates to a wet scrubber absorption process employing an aqueous absorbent slurry of particulate manganese dioxide as an oxidative absorbent.

2. Description of the Prior Art

Various processes have been proposed for reducing the content of sulfur compounds in industrial waste gases. Most of these processes relate to the removal of sulfur oxides. Because of their substantial acidic character, these sulfur oxides are readily absorbed by alkaline absorbents. Unfortunately, the same absorbents are not generally satisfactory for removing a number of important industrial by product sulfur compounds such as hydrogen sulfide, mercaptans and other organic sulfur containing compounds, since the acidic character of these compounds is generally much less pronounced. This is particularly true of the mercaptans for which there is no effective removal process being used commercially.

In British Patent Specification No. 1,576,534 a process for removing hydrogen sulfide from a hot reducing gas is disclosed. The process uses an absorbent comprising a mixture of finely divided manganese oxide, i.e., manganese of oxidation state 2, and finely divided aluminum oxide. Both the absorption and regeneration steps of the patented process require gas temperatures substantial higher than those typically encountered in industrial applications, for example, in pulping mills. Furthermore, a hot sulfur oxide-containing gas is produced by the disclosed high temperature regeneration technique, creating additional disposal problems in many cases. Moreover, it does not disclose that the absorbent can remove mercaptans from gas streams.

U.S. Pat. No. 3,898,320 to Atsukawa uses a dry, powdered absorbent comprising a hydrated manganese oxide to remove sulfur oxides from gas streams. As described, the sulfur oxides in the gas react with the hydrated manganese oxide absorbent to produce manganese sulfate. The manganese sulfate is subsequently solubilized in water, converted to manganese hydroxide in the presence of ammonium hydroxide and is thereafter reconverted to the hydrated absorbent by oxidation with an oxygen-containing gas. The oxidation is conducted by bubbling the oxygen-containing gas through an aqueous dispersion of the manganese hydroxide. As in the prior process, there is no indication that this absorbent can be used to remove $H_2S$ or reduced organic sulfur compounds, particularly mercaptans.

U.S. Pat. No. 3,492,983 to Lowicki, et al., describes a process for removing sulfur containing compounds including $H_2S$ and organic sulfur compounds which employs a complex multicomponent absorbent. This absorbent includes a metal oxide, hydrated oxide or hydroxide or preferably mixtures thereof, for example, manganese dioxide and magnesium oxide, in combination with an alkali metal or alkaline earth metal oxide or hydroxide, for example, sodium hydroxide. The absorption process is conducted at a relatively low temperature but an oxidic roasting at an elevated temperature above at least about 750° C. is required to regenerate the absorbent. As in the prior British patent, problems with disposing a high temperature regeneration gas containing sulfur dioxide are created in many cases.

Iannicelli et al, U.S. patent application Ser. Nos. 486,672 and 530,267, now U.S. Pat. Nos. 4,552,735 and 4,552,734 filed on Apr. 20, 1983 and Sept. 8, 1983, respectively, describe processes which have proved to be successful for removing TRS compounds from industrial waste gases. In these processes, a waste gas is contacted with an active manganese dioxide absorbent to remove TRS contaminants from the gas and produce a substantially dry spent absorbent powder. Spent absorbent can be regenerated, for example, by forming an aqueous slurry and then contacting it with an oxygen-containing gas.

A particularly troublesome source of TRS pollutant emissions are paper mills employing the kraft pulping process. The economics of paper making require that chemicals used to digest raw wood be recovered to the fullest extent possible. Thus, a major part of any paper mill is directed to the recovery and regeneration of such chemicals. Unfortunately, the various steps involved in the recovery and regeneration operation unavoidably generate waste gases which contain entrained particulates and odorous contaminants, principally TRS compounds. One troublesome pollutant source, for example, is the lime kiln where calcium oxide used to convert green liquor to white liquor is regenerated.

In many paper mills a wet scrubber is used to collect entrained particulates from the flue gas emissions, which in the case of a lime kiln is primarily lime dust. The dust-laden gases pass through a narrow duct where a water spray contacts the dust particles and removes them from the gas stream. In the case of the lime kiln emission, the recovered lime dust eventually is recycled for reuse. Unfortunately, the TRS contaminants usually contained in the various flue gas emissions from a paper mill are substantially unaffected by the water spray and thus are discharged with the flue gas into the environment.

Moreover, even if the scrub solution is made very highly alkaline, e.g., having a pH in the range of about 11 to 13, TRS pollutant emissions are only minimally abated. While hydrogen sulfide would be at least partially removed from the gas, other TRS compounds including mercaptans would be substantially unaffected. This approach, however, is not really practical. Besides the added expense required for safely handling such a scrubber liquid, its high alkaline content would unavoidably upset the chemistry in the pulping operation and thus would necessitate subatantial additional modification in the overall kraft mill recovery and regeneration operation.

Because such paper mills already have a wet scrubber in place, there is a strong reluctance to add any additional gas scrubbing equipment such as the spray drying absorption equipment of Ser. No. 486,672 now U.S. Pat. No. 4,552,735 or the fluid bed absorption equipment of Ser. No. 530,267, now U.S. Pat. No. 4,552,734 to the gas cleaning train to remove TRS contaminants. Thus, a need exists in the art for a wet scrubbing process having the ability to remove TRS contaminants from a gas stream.

It is an object of the present invention to provide a process for efficiently removing $H_2S$ and organic sulfur-containing compounds, and particularly mercaptans, from industrial gas streams, such as the various flue gas emissions from a paper mill.

It is another object of this invention to provide a process for removing the aforementioned sulfur compounds from industrial gas streams which permits a smooth and continuous operation suitable for automation.

It is a further object of this invention to provide a process for removing these sulfur compounds from industrial gas streams which employs a readily available absorbent that can be simply and efficiently regenerated by ambient temperature oxidation procedures.

It is yet another object of the present invention to provide a process for removing these sulfur compounds from industrial gas streams which is completely compatable with the wet scrubber processes widely used for removing solid pollutants from such industrial gases.

It is still a further object of the present invention to provide a process for removing sulfur compounds from industrial gases by a wet scrubber process which provides for separate recycle of recovered entrained particulates and active scrubber liquid.

SUMMARY OF THE INVENTION

These and other objectives which will readily occur to those skilled in the art are achieved by the present invention which comprises a process for removal of Total Reduced Sulfur compounds and recovery of non-magnetic entrained particulates from an industrial gas comprising the steps of:

(a) scrubbing said industrial gas with an aqueous absorbent slurry containing activated manganese dioxide absorbent particles in a reaction zone to effect oxidation of said Total Reduced Sulfur compounds and recovery of Total Reduced Sulfur compound oxidation products and said non-magnetic entrained particulates in said aqueous absorbent slurry;

(b) recovering from said reaction zone said aqueous absorbent slurry containing manganese dioxide absorbent particles, reduced manganous compounds, Total Reduced Sulfur compound oxidation products and non-magnetic entrained particulates;

(c) subjecting at least a portion of said aqueous absorbent slurry recovered in step (b) to oxidation to produce an aqueous absorbent slurry containing activated manganese dioxide absorbent particles;

(d) recycling the aqueous absorbent slurry containing activated manganese dioxide absorbent particles to the reaction zone as at least a portion of said aqueous absorbent slurry for step (a);

(e) magnetically separating manganese dioxide absorbent particles from at least a portion of the recirculating aqueous absorbent slurry to produce a substantially manganese dioxide-free, aqueous slurry containing said recovered non-magnetic entrained particulates;

(f) removing a stream of said substantially manganese dioxide-free, aqueous slurry containing said recovered non-magnetic entrained particulates from the recirculating aqueous slurry; and (g) recycling said magnetically separated maganese dioxide absorbent particles to said recirculating aqueous absorbent slurry.

In a preferred embodiment of this invention, the aqueous absorbent slurry containing manganese dioxide absorbent particles and reduced manganeous compounds is regenerated (i.e., activated) by:

(a) establishing an aqueous regeneration medium by supplying a flow of oxygen-containing gas through said aqueous absorbent slurry;

(b) after the oxygen-containing gas flow of step (a) has begun, maintaining, by alkaline material addition if necessary, the pH in said regeneration medium at an alkaline level sufficient for producing an aqueous absorbent slurry containing activated manganese dioxide absorbent particles; and (c) continuing the flow of said oxygen-containing gas through the alkaline regeneration medium for a period sufficient to produce an aqueous absorbent slurry containing activated manganese dioxide absorbent particles.

BRIEF DESCRIPTION OF THE DRAWINGS

The exact nature of the present invention, as well as the objects and advantages thereof, will be more readily apparent from the following specification in connection with the attached drawings in which.

DESCRIPTION OF THE INVENTION

Figure 1:
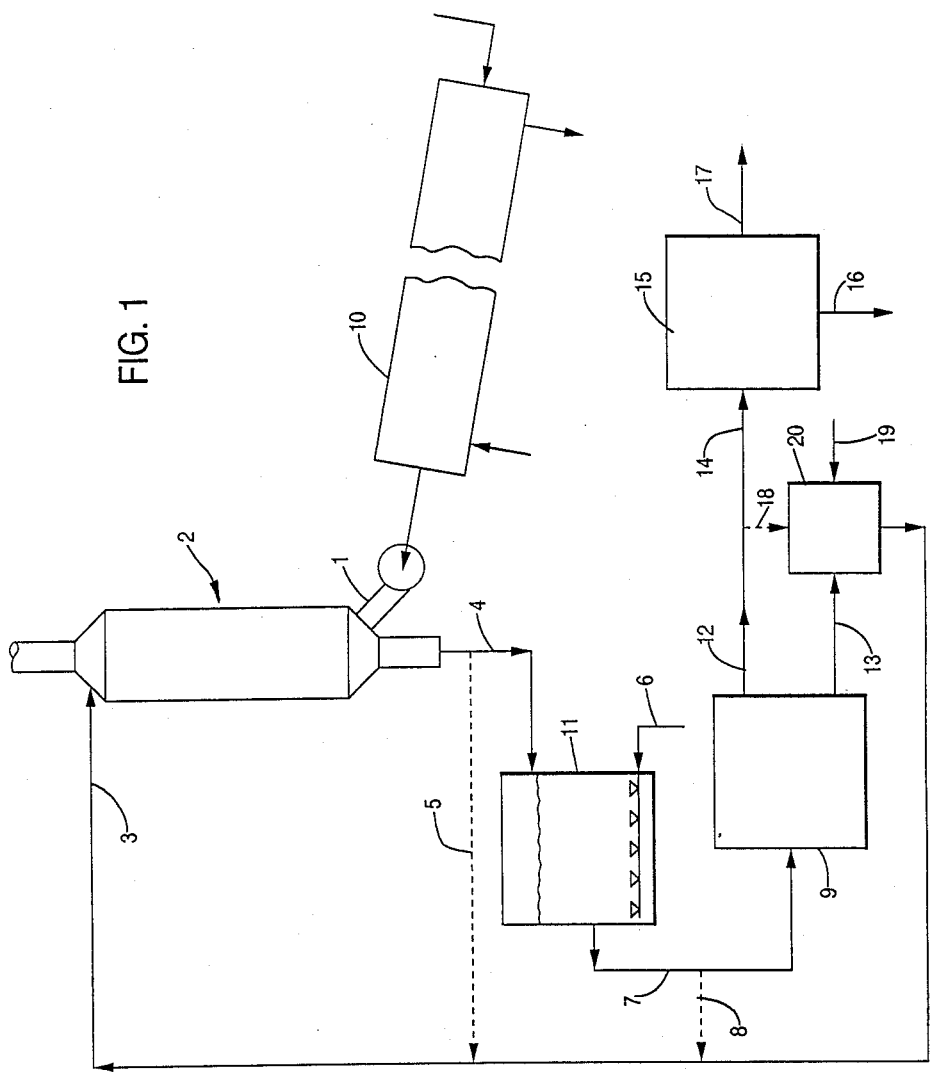
FIG. 1 is a general schematic flow diagram showing the process of this invention.

As used in the specification and claims, the term "industrial gas" refers to gases produced as products or byproducts in industrial processing facilities including, for example, waste gases from pulping mills, particularly kraft mills, petroleum refineries, and other chemical manufacturing and refining installations.

The term "Total Reduced Sulfur compounds" herein refers in general to sulfur compounds having no substantial acidic character and includes, inter alia, $H_2S$, mercaptans such as methyl mercaptan, butyl mercaptan and the like, organic sulfides such as dimethyl sulfide, dimethyl disulfide, dimethyl sulfoxide and similar materials including homologs of the foregoing. These Total Reduced Sulfur (TRS) compounds are typically toxic and/or ordorous contaminants of various industrial gases which must be at least partially removed before releasing the gases into the environment or before the gases can be used for other purposes.

The terms "manganese dioxide" or "$MnO_2$" as used in the specification and claims refer to both naturally occurring forms, i.e., ores, and synthetic forms of this compound. In addition, "$MnO_2$" materials employed as virgin starting material or as regenerated materials can have an oxygen content below exact stoichiometric amounts, i.e., slightly less than 2. Moreover, it is to be understood that the formula and term also cover compounds which may be hydrated. For convenience, all these $MnO_x$ materials are simply referred to as $MnO_2$ or manganese dioxide.

As used herein the terms "wet scrubber" and the like refer to apparatus and methods well-known in the pollution abatement art for removing solid, liquid and gaseous contaminants from a gas stream by directly contacting the gas with a liquid which remains a liquid throughout the contacting process and is recovered as a liquid.

The basic starting material employed in the process of the present invention is the $MnO_2$ absorbent. In order to be useful in the absorption process it is necessary that the $MnO_2$ employed be activated. Some sources of $MnO_2$ by either their nature or their method of production possess this activity without special treatment. In many cases, however, it is necessary to perform an activation step prior to use of the MnO₂ as an absorbent for TRS compounds. According to the present invention, this activation is preferably accomplished by subjecting the non- or partially-active MnO₂ to at least one reduction/oxidation cycle. While this redox cycle treatment can, of course, be effected as a separate absorbent preparation step, it is preferred to utilize hereinafter-described regeneration steps of the present invention to effect or enhance the activation of the absorbent. Using this approach, the recycled regenerated material is in effect activated by reduction in the reaction zone of the wet scrubber and oxidation in the regeneration step.

It has also been found that the activity of some MnO₂ starting material or unregenerated recycle MnO₂ (as described hereinafter) is increased by merely forming a slurry of the absorbent with water. This may have the effect of removing interfering water-soluble salts on the surface of the insoluble MnO₂ materials. While initial activities of various MnO₂ materials may vary widely, the wet oxidative regeneration step of the present invention results in high activity for most MnO₂ materials.

In the first step of the process of the present invention an aqueous scrubber slurry or aqueous absorbent slurry containing activated MnO₂ absorbent particles in conduit 3 is contacted with the industrial gas in the reaction zone of wet scrubber 2. The aqueous scrubber liquid may contain between about 1% and 50% by weight of the activated MnO₂ absorbent particles. Preferably the aqueous absorbent slurry contains 2% to 10% by weight of the activated MnO₂ absorbent particles.

The industrial gas, generated, for example, in lime kiln 10 is introduced into wet scrubber 2 through conduit 1. The industrial gas typically can have contaminant levels of TRS compounds of at least about 10 ppm and often at least about 500 and can range up to 1,000 ppm or more, depending on the source. In the case of the flue gas emission from a lime kiln in a paper mill the industrial gas typically will have a TRS contaminant level of about 50 to 300 ppm.

In addition to the gaseous contaminants, the industrial gas stream generally also contains non-magnetic particulate materials such as alkaline dust (lime dust) or other fly ash type particulates. The presence of such materials in the gas does not prevent the oxidation and removal of TRS compounds.

The gas flow rate through the reaction zone can vary depending on the nature of the apparatus employed and the conditions of operation. The gas flow rate and flow rate of the aqueous scrubber slurry must be adjusted with respect to one another to ensure that effective removal of TRS compounds and entrained particulates occurs. Those skilled in this art will readily be able to determine proper contacting conditions.

In the wet scrubber reaction zone 2, the industrial gas stream and the aqueous absorbent slurry containing activated manganese dioxide absorbent particles are contacted so that at least a part of the TRS compounds are simultaneously removed from the gas by MnO₂ oxidation and absorption of the TRS compound oxidation products in the absorbent slurry. The exact nature of all reactions taking place in the scrubber reaction zone is not completely known and will, of course, vary with the nature of the industrial gas. In general, however, sulfur containing compounds are converted (oxidized) at least initially to sulfates or sulfonates while the MnO₂ is reduced to a lower valence state, i.e., $Mn^{++}$.

An aqueous absorbent slurry containing manganese dioxide absorbent particles, reduced manganous compounds, Total Reduced Sulfur oxidation products and entrained particulates is recovered from the wet scrubber sump in line 4. In accordance with the present invention, at least a portion of this slurry is then regenerated by liquid phase oxidation of $Mn^{++}$ compounds resulting from the reactions taking place in the scrubber reaction zone to produce an activated manganese dioxide containing absorbent slurry. The products of regeneration include an insoluble reactivated MnO₂ and soluble sulfur-containing compounds. Another portion of the slurry may be directly recycled through conduit 5 (indicated by a dotted line) to wet scrubber reaction zone 2. Alternatively, all of the absorbent slurry in line 4 can be passed to the oxidative regeneration section 11, where it is contacted with an oxygen-containing gas such as air, introduced via conduit 6.

While specific oxidative regeneration procedures will be subsequenlty described, suitable oxidation techniques include electrolytic oxidation (including oxidation by nascent oxygen) and treatment with various oxidizing agents, such as oxygen-containing gases (e.g., air), ozone, peroxides, persulfates, permanganates, hypochlorites, perchlorates, hypochlorates, and the like. Preferably, these techniques are carried out at ambient temperatures although somewhat higher or lower temperatures may be employed as long as the liquid system is not adversely affected, e.g., by boiling or freezing.

As indicated above, the spent absorbent slurry contains unreacted MnO₂ particles and reduced Mn values, possibly as soluble $Mn^{++}$ salts. The preferred regeneration approach is to subject the entire absorbent slurry to oxidation. While not wishing to be bound to any particular theory, applicant believes that oxidation of $Mn^{++}$ values may take place at or on the surface of the spent absorbent particles and/or in the aqueous phase due to solubilization (extraction) of these values. In any event, the regeneration of MnO₂ from $Mn^{++}$ values is best accomplished by oxidizing the complete aqueous absorbent slurry (possibly containing both absorbed and extracted $Mn^{++}$ values).

A portion of the oxidized absorbent slurry recovered from oxidative regeneration section 11 in conduit 7 then can be subjected to a magnetic separation in a high intensity magnetic separator 9 in order to separate selectively insoluble (magnetic) manganese dioxide absorbent particles from entrained (non-magnetic) particulates which were recovered in the aqueous absorbent slurry.

In the broad practice of this invention, any portion of the recirculating aqueous absorbent slurry can be subjected to the step of magnetic separation. If desired one portion of the oxidized slurry may be directly recycled to wet scrubber reaction zone 2 through conduit 8 (indicated by a dotted line). Alternatively, all of the aqueous absorbent slurry removed from oxidative regeneration section 11 in conduit 7 is subjected to magnetic separation in separator 9.

While manganese dioxide normally is considered to be nonmagnetic, applicant has found that, being weakly paramagnetic, it can be extracted in a high intensity, high gradient separator. A suitable separator is described in Jones U.S. Pat. No. 3,346,116.

In magnetic separator 9, a substantially manganese dioxide-free, non-magnetic fraction comprising the recovered entrained particulates is separated from the manganese dioxide. The non-magnetic fraction of the absorbent slurry is removed from separator 9 in conduit 12. A portion or bleed stream of the recovered non-magnetic fraction of the absorbent slurry is removed from the recirculating absorbent slurry via conduit 14 as the source for recycling recovered entrained particulates to the pulping mill operation. In this embodiment, this bleed stream also removes soluble oxidized sulfur products from the recirculating absorbent slurry. The entrained particulates 18 and soluble oxidized sulfur products 17 then can be separated using any conventional solids-liquid separation device such as a clarifier 15.

An important advantage of the process of the present invention is the ability to bleed off the soluble oxidized sulfur products (i.e., sulfates, sulfonates, sulfinates and the like) and the resulting elimination of the counterproductive need to regenerate the oxide by high temperature heating. In the context of paper mill gas effluent treatment, some part of the bleed-off solution from the regeneration of manganese dioxide can be sent to the recovery boiler where it will be converted into sodium sulfate suitable for reuse in the pulping process. Generally, sodium ions will also be present in the aqueous phase (bleed-off) removed from the system. This bleeding or partial dewatering can be effected by a number of techniques which include, inter alia, sedimentation, wet cycloning, centrifuging, filter pressing and the like. As noted, this bleeding operation can also be used to remove accumulated, non-magnetic entrained particulates scrubbed from the industrial gas stream.

The magnetic $MnO_2$ portion of the aqueous absorbent slurry recovered from separator 9 in line 13, any portion of the non-magnetic fraction 12 not removed through bleed stream 14 (indicated by dotted line 18), and make-up water 19 needed to balance evaporative loses in the various steps of the presence, including wet scrubber 2, and to offset the loss of water removed through bleed stream 14, are consolidated in aqueous absorbent slurry surge tank 20. From surge tank 20 the slurry is fed via conduit 3 into wet scrubber reaction zone 2 and the absorption-regeneration cycle is repeated.

Figure 2:
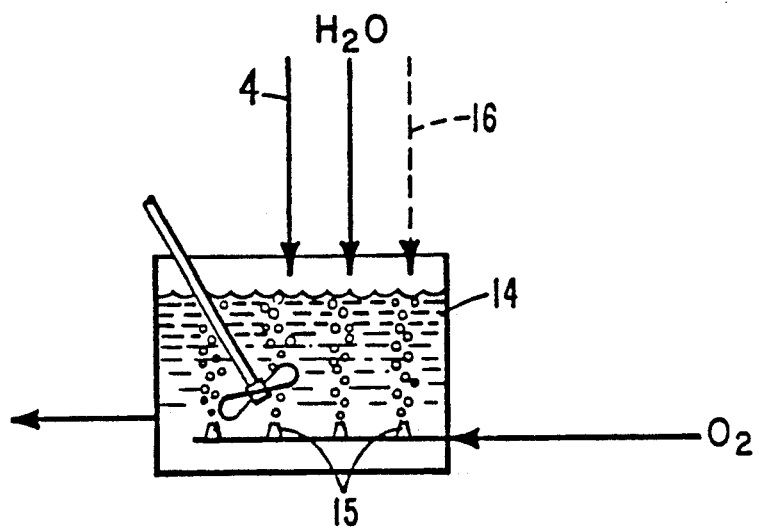
FIG. 2 is a schematic flow diagram illustrating a preferred embodiment for regeneration of the spent absorbent to be used in the process depicted in FIG. 1.

A suitable regeneration procedure will now be described hereinafter in connection with the preferred type of oxidative regeneration—that employing an oxygen-containing gas (e.g., air) as the oxidizing agent. The oxidative regeneration procedure is illustrated in FIG. 2. An oxidizing vessel 14 is provided with means for aerating the contents thereof with an oxygen-containing gas. Air will generally be used because of economic considerations. Although nozzles 15 are illustrate as the means for introducing gas into vessel 14, other means including aerators of the surface or submerged variety may also be used. Such aerating means are well known to one skilled in the art.

To accomplish regeneration, the spent aqueous absorbent slurry 4 is added to the aerated aqueous medium in vessel 14. An important feature of this regeneration procedure is the establishment of a well-aerated aqueous medium in vessel 14 before the aqueous absorbent slurry to be regenerated is introduced thereto. Another parameter which appears important in this regeneration scheme is the pH of the aerated aqueous medium. The oxidative regeneration is based primarily on the following overall reaction:

$$2Mn^{++} + O_2 + 4OH^- \rightarrow 2MnO_2 + 2H_2O$$

While not wishing to be bound to any particular theory, it is believed that this overall reaction actually proceeds via the precipitation of an intermediate $Mn(OH)_2$ which in turn is oxidized to $MnO_2$. This reaction via $Mn(OH)_2$ proceeds most efficiently under alkaline pH conditions. While the exact pH necessary to effect production of an activated $MnO_2$ absorbent (e.g., by $Mn(OH)_2$ precipitation) can vary widely dependent on the nature of the absorbent and its concentration in the slurry, in general, the slurry pH should be adjusted (unless already alkaline) to a value of at least 7 or above and preferably in the range of from about 9 to 12.5. The proper pH for any particular regeneration system can be determined experimentally. If the pH is too low or too high, an active $MnO_2$ may not be produced.

Since the above reaction indicates a consumption of hydroxide ions, it may be necessary to provide for a continuous addition of alkali to the vessel 14 as indicated by the dotted line 16. However, since a sufficient amount of alkali will often be present in the material to be regenerated through line 4, the addition of further alkaline material may not be necessary.

The proposed $Mn(OH)_2$ intermediate reaction route is also primarily responsible for the requirement of starting the flow of oxygen-containing gas at the very beginning of the regeneration process. It has been found that sufficient oxygen must be present at the formation of insoluble $Mn(OH)_2$ precipitate so it can be immediately oxidized to $MnO_2$. If $Mn(OH)_2$ is allowed to age before oxidation takes place, crystallization of the hydroxide may occur making oxidation to an active form of $MnO_2$ difficult or impossible.

As noted before, a particularly advantageous feature of the present invention is that the oxidative regeneration can be performed at ambient temperatures and at average residence times on the order of a few hours. The regeneration may be performed in a batchwise fashion or as a continuous process. When substantially all of the manganous compounds have been converted into an activated manganese dioxide, the resulting slurry is ready to be reused for removing TRS compounds from the industrial gas.

The following examples are intended to illustrate more fully the nature of the present invention without acting as a limitation on its scope.

EXAMPLE 1

An amount of $MnO_2$ was prepared by spraying a solution of $MnSO_4$ (10%) into a container which was aerated by means of nozzles. The pH of the solution in the container was continuously adjusted to 9 by addition of aqueous sodium hydroxide. Aeration was continued for one hour after the addition of the $MnSO_4$ solution was completed. The precipitated $MnO_2$ was washed several times, filtered and dried in an oven at 105° C. A sample of the prepared $MnO_2$ was analyzed by the oxalate method and the composition found to be $MnO_{1.70}$. This material was active for removing TRS compounds and particularly $H_2S$ and $CH_3SH$ from a gas stream. The reaction material regained its activity by washing and oxidation.

The reacted $MnO_2$ was analyzed for $SO_4^{-2}$ using an ion chromatograph by the following 3 methods: Method 1: The material was extracted with water (stirring for 30 minutes) and the filtrate analyzed for $SO_4^{-2}$; method 2: same as method 1 except that the extraction was done with 0.5N HCl; method 3: same as method 1 except that the extraction was done with a mixture of 0.5N HCl and 3% $H_2O_2$. Methods 1 and 2 gave identical results while method 3 showed a small increase in $SO_4^{2-}$ content per gram of sample compared to the other methods, showing that about 98% of sulphur was in the form of sulphate and the rest as free sulphur.

EXAMPLE 2

This example demonstrates the use of an oxidizing agent such as sodium hypochlorite in the ambient temperature, liquid phase oxidative regeneration of spent $MnO_2$ absorbent. The spent $MnO_2$ absorbent slurry was activated (oxidized) by treatment with 10% (W/W) of a sodium hypochlorite solution containing 12.3% (W/W) active chlorine. The recovered precipitate exhibits the desired activity for TRS compounds.

While certain specific embodiments of the invention have been described with particularity herein, it will be recognized that various modifications thereof will occur to those skilled in the art. Therefore, the scope of the invention is to be limited solely by the scope of the appended claims.

I claim:

1. A process for the removal of Total Reduced Sulfur compounds and recovery of non-magnetic entrained particulates from an industrial gas comprising the steps of:
    (a) scrubbing said industrial gas with an aqueous absorbent slurry containing activated manganese dioxide absorbent particles in a reaction zone to effect oxidation of said Total Reduced Sulfur compounds and recovery of Total Reduced Sulfur compound oxidation products and said non-magnetic entrained particulates in said aqueous absorbent slurry;
    (b) recovering from said reaction zone said aqueous absorbent slurry containing manganese dioxide absorbent particles, reduced manganous compounds, Total Reduced Sulfur compound oxidation products and non-magnetic entrained particulates;
    (c) subjecting at least a portion of said aqueous absorbent slurry recovered in step (b) to oxidation to produce an aqueous absorbent slurry containing activated manganese dioxide absorbent particles;
    (d) recycling the aqueous absorbent slurry containing activated manganese dioxide absorbent particles to the reaction zone as at least a portion of said aqueous absorbent slurry for step (a);
    (e) magnetically separating manganese dioxide absorbent particles from at least a portion of the recirculating aqueous absorbent slurry to produce a substantially manganeses dioxide-free, aqueous slurry containing said recovered non-magnetic entrained particulates;
    (f) removing a stream of said substantially manganese dioxide-free aqueous slurry containing said recovered non-magnetic entrained particulates from the recirculating aqueous absorbent slurry; and
    (g) recycling said magnetically separated manganese dioxide absorbent particles to said recirculating aqueous absorbent slurry.

2. The process of claim 1 wherein said Total Reduced Sulfur compounds comprise hydrogen sulfide, mercaptans and mixtures thereof.

3. The process of claim 1 wherein said activated manganese dioxide absorbent additionally comprises an alkaline component.

4. The process of claim 3 wherein said alkaline component is selected from the group consisting of sodium hydroxide, sodium hydrogen carbonate and sodium carbonate.

5. The process of claim 1 wherein at least a part of said aqueous absorbent slurry recovered from said reaction zone is recycled directly back to said reaction zone.

6. The process of claim 1 wherein said oxidation is effected employing an oxidizing agent selected from the group of air, oxygen, ozone, peroxides, persulfates, permanganates, hypochlorites, and mixtures thereof.

7. The process of claim 1 wherein said oxidation is effected electrolytically.

8. The process of claim 6 wherein said oxidation agent is passed through an aqueous regeneration medium to which the aqueous absorbent slurry to be regenerated is subsequently added.

9. The process of claim 1 wherein a portion of said aqueous absorbent slurry which is recovered in step (b) and which is subjected to oxidation is subsequently subjected to said magnetic separation of step (e).

10. The process of claim 1 wherein a portion of said aqueous absorbent slurry which is recovered in step (b) comprises the recirculating aqueous absorbent slurry which is subjected to said magnetic separation of step (e) and said aqueous absorbent slurry is subjected to said oxidation of step (c) after said magnetic separation and said recycling of said magnetically separated manganese dioxide absorbent particles.

11. The process of claim 1 wherein oxidation of step (c) comprises
    (a) establishing an aqueous regeneration medium by supplying a flow of oxygen-containing gas through said aqueous absorbent slurry;
    (b) after the oxygen-containing gas flow of step (a) has begun, maintaining, by alkaline material addition if necessary, the pH in said regeneration medium at an alkaline level sufficient for producing an aqueous absorbent slurry containing activated manganese dioxide absorbent particles; and
    (c) continuing the flow of said oxygen-containing gas through the alkaline regeneration medium for a period sufficient to produce an aqueous absorbent slurry containing activated manganese dioxide absorbent particles.

* * * * *

UNITED STATES PATENT AND TRADEMARK OFFICE
CERTIFICATE OF CORRECTION

PATENT NO. : 4,923,688
DATED : May 8, 1990
INVENTOR(S) : Joseph Iannicelli

It is certified that error appears in the above-identified patent and that said Letters Patent is hereby corrected as shown below:

Col. 1, line 23, "by product" should read -- byproduct --

Col. 1, line 37, "substantial" should read -- substantially --

Col. 7, line 9, "18" should read -- 16 --.

Col. 7, line 35, "presence" should read -- process --.

Col. 9, line 53, (Claim 1, subpart (e), line 4), "manganeses" should read -- manganese --

Col. 10, line 21, (Claim 6, line 3), after "group" insert -- consisting --.

Signed and Sealed this

Eleventh Day of June, 1991

Attest:

HARRY F. MANBECK, JR.

Attesting Officer    Commissioner of Patents and Trademarks